US006563771B1

(12) United States Patent
Debiez (10) Patent No.: US 6,563,771 B1
(45) Date of Patent: May 13, 2003

(54) DIGITAL DATA DISC LIBRARY APPARATUS

(75) Inventor: Jacques Debiez, Saint Simon (FR)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/532,600

(22) Filed: Mar. 22, 2000

(51) Int. Cl.[7] .............................................. G11B 17/24
(52) U.S. Cl. ................................................... 369/30.79
(58) Field of Search ............................. 369/30.5, 30.62, 369/30.42, 30.6, 30.71, 30.75, 30.79, 30.86, 30.9, 30.91

(56) References Cited

U.S. PATENT DOCUMENTS

| | | |
|---|---|---|
| 3,008,721 A | 11/1961 | Corbett et al. |
| 4,344,162 A | 8/1982 | Foufounis |
| 4,734,814 A | 3/1988 | Fujino et al. |
| 5,235,579 A | 8/1993 | Ross |
| 5,274,620 A | 12/1993 | Sipos |
| 5,307,331 A | 4/1994 | d'Alayer de Costemore d'Arc |
| 5,644,558 A | 7/1997 | Inatani et al. |
| 5,886,974 A | 3/1999 | Bos et al. |

FOREIGN PATENT DOCUMENTS

WO     WO 87/07423     12/1987

*Primary Examiner*—George J. Letscher
(74) *Attorney, Agent, or Firm*—Merchant & Gould; Wayne P. Bailey (57) ABSTRACT

An apparatus and system for handling and storing a plurality of data storage discs includes a toroidal configuration of storage locations for the discs, a plurality of disc drives mounted above the storage locations in a generally annular arrangement, a means for moving any disc into and out of each selected drive on demand, and a control means for directing operation of the means for moving the discs and controlling selection of operation of the disc drives. The apparatus also has another plurality of data storage discs in a secondary module comprising another torodial configuration of storage locations for the discs mounted below the first plurality, a means for moving any disc between the two pluralities of storage locations, and a control means for directing the movement of the discs. The apparatus also has a supplies module mounted beneath the secondary module and houses the power supplies and environmental control equipment necessary for the system. The apparatus includes a access port for the loading and unloading of discs by the user and control means for directing the loading and unloading of discs.

20 Claims, 5 Drawing Sheets

DIGITAL DATA DISC LIBRARY APPARATUS

BACKGROUND OF THE INVENTION

1. Field of the Invention

The present invention relates generally to data storage devices and systems, and more particularly to a data disc library apparatus utilizing multiple removable disc drives and multiple removable disc media arranged in an annular configuration.

2. Description of Related Art

A typical digital data tape cartridge handling library includes number of columns of stacked bins containing data tape cartridges positioned around a centrally located manipulating arm with a cartridge grasping hand which can rotate, translate and elevate to position the hand in front of a particular bin containing the desired cartridge.

Multiple compact audio disc (CD) and digital video disc (DVD) storage and handling apparatuses are also known. Some disc storage apparatus configurations are toroidal and some are linear stacks. Representative examples of such read only Jukebox disc changers are disclosed in U. S. Pat. Nos. 5,644,558; 5,235,579; 5,886,974; 5,307,331; 5,274,620; 4,567,584; 4,734,814; 3,008,721; and WIPO publication No. WO87/07423.

These apparatuses are all directed to the handling of discs or cartridges one at a time. This requires a substantial time period of drive inactivity while a disc is unloaded or loaded between the library storage and the drive. In the case of tape cartridge libraries, this delay is compensated for by having several drives being accessible to the manipulator apparatus. However, in the handling of digital data, especially where the reading and writing of critical data is involved, speed of access to data is important and the simultaneous handling of multiple data storage cartridges may be desirable.

In the case of optical digital media, the random access speed is currently limited typically to between 100 ms to 200 msec. However, large amounts of data can be stored on these discs such as currently up to about 17 gigabytes of data. Currently only 1 to 4 drives have been used in jukebox type CD and DVD devices and these are read only devices. Thus access speed is extremely limited for data handling purposes. Accordingly there is a strong need for an apparatus that overcomes the limitations posed by current CD and DVD access times in order to make the optical disc media suitable for data intensive operations, such as in the terabyte range, which is reliable, low cost, and compact.

It is with respect to these and other considerations that the present invention is made which utilizes conventionally available read and writable (R for WORM or RW, or RAM) CD and future DVD drives and conventional optical disc media combined into a new configuration.

SUMMARY OF THE INVENTION

The present invention is an apparatus for handling and storing a plurality of removable digital data storage modules, e.g. tape cartridges or discs. The apparatus comprises a toroidal configuration of storage locations for the discs or cartridges, a plurality of disc or cartridge drives mounted adjacent to the storage locations in a generally annular arrangement, a means for moving any disc or cartridge into and out of each selected drive on demand; and a control means for directing operation of the means for moving the discs or cartridges and controlling selection and operation of the disc drives.

More particularly, the apparatus in accordance with a preferred embodiment the present invention comprises a stationary frame, a rotating frame or "carousel" mounted on the stationary frame supporting a number of data discs in a toroidal configuration for rotation about a central axis. A plurality of drives are mounted to the stationary frame in an annular configuration above the carousel. A motor is operably connected between the stationary frame and the carousel for rotation of the carousel about the central axis. Beneath each disc drive is a lift mechanism comprised of a lift finger operably extending below the carousel and a motor to raise and lower the arm. The lift mechanism operates to vertically lift a data disc positioned beneath the disc drive into an opening in the drive and receive and lower a disc ejected from the drive. A disc access port in the drive module is preferably provided for manual loading of one or more discs into the carousel. A controller is operably connected to each of the lift mechanisms and to the carousel motor which controls alignment of the carousel, and insertion and removal of the disc from any one of the disc drives in accordance with a demand schedule from a library controller. The library controller manages and coordinates the operation of the disc drives, the lift mechanisms and the operation of the carousel to cue the discs to the desired drives.

Further, a secondary rotating carousel and a secondary storage transfer mechanism is preferably provided for additional storage capacity. The secondary carousel is mounted to the stationary frame below the first, or primary, carousel and a drive motor is operably connected between the stationary frame and the secondary carousel for independent rotation of the carousel about the central axis. The secondary carousel also supports a number of data discs in a toroidal configuration for rotation about the central axis. The secondary storage disc transfer mechanism or passthrough device is fastened to the stationary frame and has a lift finger which operably moves discs between the primary and secondary carousels. The passthrough device vertically lifts a data disc and transfers it from the lower, secondary carousel to the uppers primary carousel. The library controller is operably connected to the passthrough device, the carousel motor that controls alignment of the secondary carousel, and insertion and removal of the disc from the primary carousel in accordance with a demand schedule from a library controller. The present invention is particularly applicable to the manipulation of removable media, without any caddy, or specific media protection or enclosure. It also take advantage of the standard φ120 mm, 1.2 mm thick media used for CD-x and DVD-x.

These and various other features as well as advantages which characterize the present invention will be apparent from a reading of the following detailed description and a review of the associated drawings.

DETAILED DESCRIPTION OF THE PREFERRED EMBODIMENT

Throughout this description, reference is made to a data storage disc and disc drive modules. These are one type of removable digital data storage units or complementary drive modules. It is to be understood that "disc" and "disc drive" as used herein applies equally well to tape cartridges and tape cartridge drive modules and thus, the terms "tape cartridge" and "cartridge drive" may be substituted for "disc" and "disc drive" throughout the following detailed description.

Figure 4:
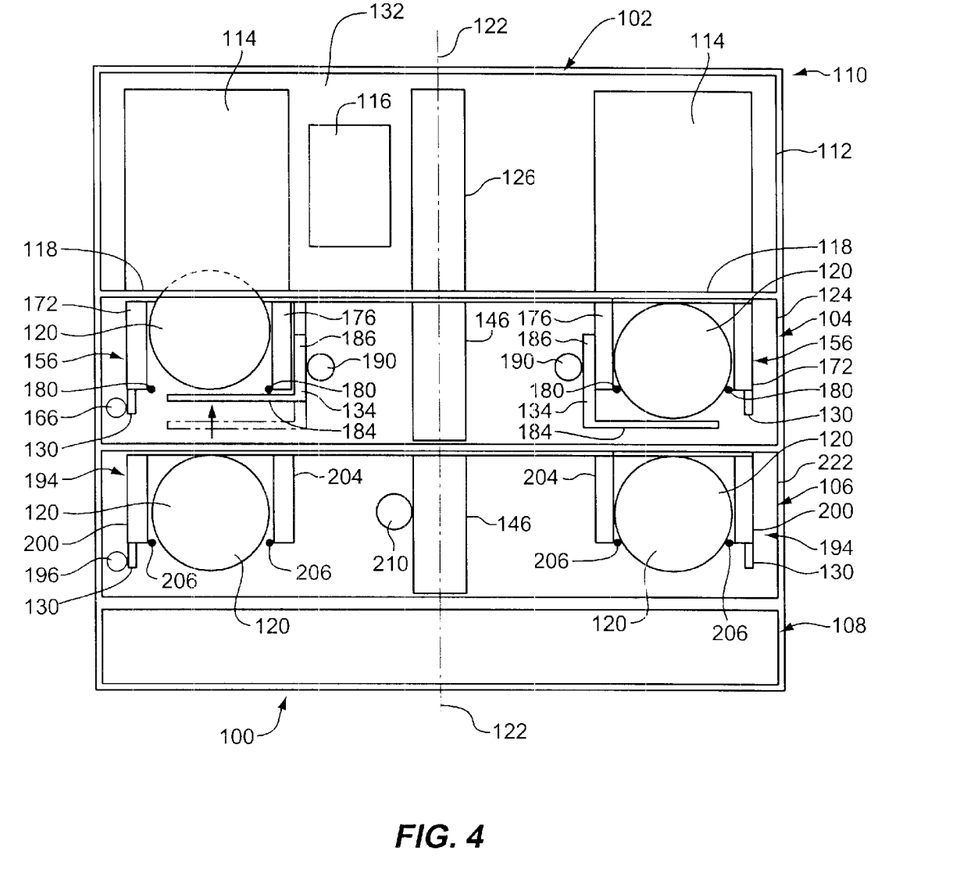
FIG. 4 is a schematic vertical sectional view of the apparatus in accordance with the present invention shown in FIGS. 1 and 2.

A section view of a preferred embodiment of the present invention involving removable data storage discs, is presented in FIG. 4. This preferred embodiment is a data storage disc handling apparatus or system 100 including of a disc drive module 102, a primary storage disc module 104, a secondary or long term storage disc module 106, and a supplies module 108. Although the modules can be installed in any shape cabinet 110, in the preferred embodiment the modules are installed in a standard 19" 18U cabinet 110 and are stacked vertically one on top of the other with the disk drive module 102 on top, the primary disc storage module 104 below it, the secondary storage disc module 106 below the primary storage disc module 104 and the supplies 108 module at the bottom.

Figure 2:
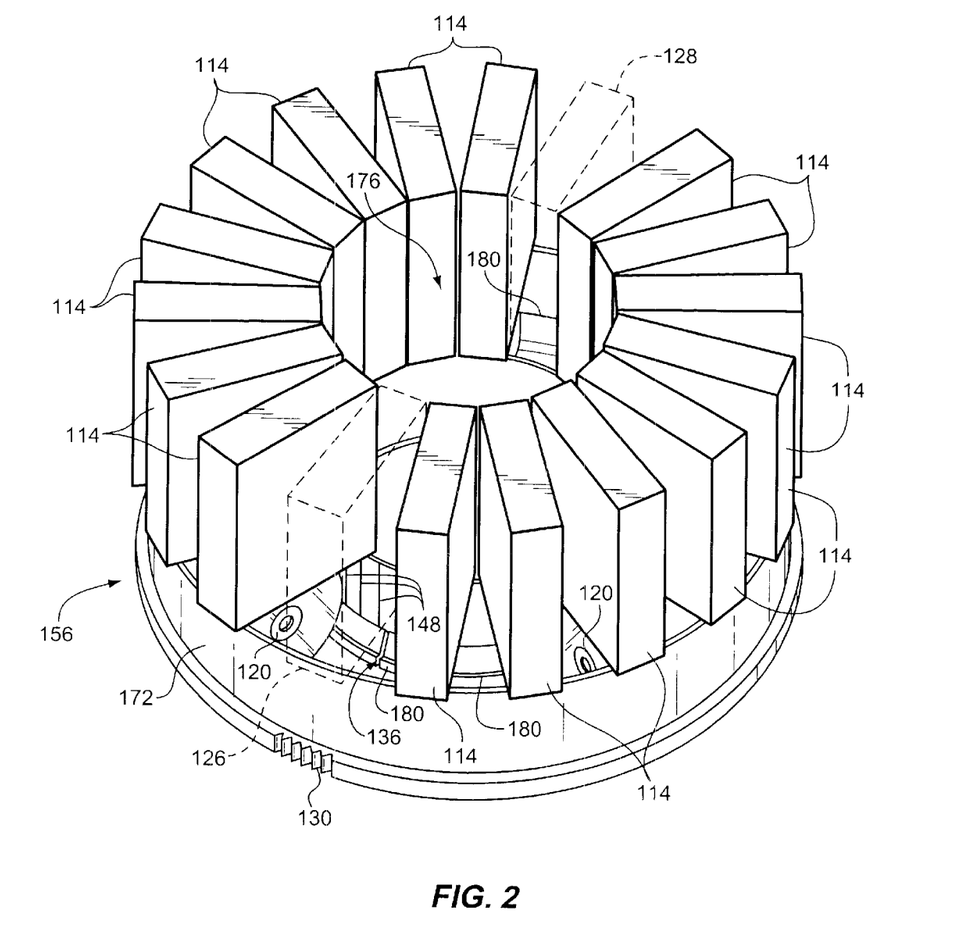
FIG. 2 is an upper perspective cut away view of the apparatus in accordance with the present invention showing the disc drives, the disc access port transfer device, the disc passthrough device and the primary storage disc carousel.

The drive module 102 includes of a stationary frame 112 upon which is fastened a plurality of disc drives 114, and the library controller electronics 116. The drives 114 are installed in a vertical configuration with the disc entrance slot 118 facing down to receive data storage discs 120 from the primary storage disc module 104 below it. The drives 114 are arranged in a circle around and spaced from a central vertical axis 122. As shown in FIG. 2, the drive module 102 has eighteen separate positions or "bays" for drives 114 spaced equally around the central axis 122. Drives can be mounted either all in the same or half reversed (180°) position, so that dual sided media can be handled, since—in most existing drives, especially DVD—one drive can access only one side of the media. FIG. 2 shows sixteen drives 114 installed. One drive bay is reserved for a secondary storage disc passthrough device 126 and one drive bay is reserved for a disc access port 128. The stationary frame 112 can be made of steel, aluminum or other structural support material and allows for the positive attachment of the drives 114 to the frame 112. The center region 132 within the drive module 102 physically contains the library controller electronics 116 and may have portions of the primary storage disc transfer mechanisms 134 and the secondary storage disc passthrough mechanism 146 which are discussed below.

The drives 114 are of the "slot-in" type that do not have an extending disc cradle or caddie. The use of slot-in drives is not mandatory, however this reports the disc grasping mechanism into the drive. A disc 120 is loaded vertically into a slot-in drive 114 by partially raising the disc 120 into the entrance slot 118 of the drive 114 from below. An internal grasping mechanism pulls the disc 120 into position within the drive. For ejection, the internal grasping mechanism lowers the disc 120 out of the drive 114 where it is received by the primary storage disc transfer mechanism 134. The transfer mechanism then returns the disc 120 to the primary storage disc module 104. The drives 114 are connected and are controlled by to the library controller 116 via EIDE, SCSI, USB or similar standard interface cables 140.

The secondary storage disc passthrough device 126 can be a disc drive 114 or, as in the preferred embodiment, a simpler passthrough-specific device 126 that's only purpose is to temporarily store a disc 120 to be transferred from the secondary storage disc module 106 to the primary storage disc module 104 or vice versa. The passthrough device 126 is fastened to the stationary frame 112 of the drive module 102 in a drive bay in the same manner as a disc drive 114. The passthrough device 126 is a slot-in device similar to the disk drives 114 and a disc 120 is loaded vertically into the passthrough device 126 by partially raising the disc 120 into the entrance slot 118 of the device 126 from below. An internal grasping mechanism pulls the disc 120 into position within the device 126. For ejection, the internal mechanism lowers the disc 120 out of the device 126 where it is received by the secondary storage disc passthrough transfer mechanism 146. The passthrough transfer mechanism 146 then places the disc into an empty disc slot 148 in either the primary 104 or secondary 106 storage disc module. The passthrough device 126 is connected to and controlled by the library controller 116 via EIDE, SCSI, USB or similar standard interface cables 140.

The disc access port 128 allows external access to storage discs 120 for manual loading, unloading and inspection of the discs 120. The disc access port 128 includes of a removable cartridge (not shown) which typically may have up to eight or more slots to receive up to eight or more discs 120 and is a transfer device into which the cartridge is loaded, for transferring discs 120 from the cartridge into the primary storage disc module carousel 156 and vice versa. The access port 128 has the same internal slot-in mechanism as does each of the disc drives 114 which transfers discs 120 between the cartridge and the primary storage disc transfer mechanism 134.

Discs 120 are loaded into the access port 128 from the primary storage disc module 104 in order to remove discs 120 from the system 100 by partially raising the disc 120 into the entrance slot 118 to the port 128 from below. An internal mechanism pulls the disc 120 from the primary storage disc transfer mechanism 134 and positions it in the removable cartridge. The port 128 is fastened to the stationary frame 112 of the drive module 102 in a drive bay in the same manner as a disc drive 114. The drive bay designated for the port 128 is provided with an opening in the stationary frame 112 and system cabinet 110 through which the cartridge can pass. The disc access port 128 is connected to and controlled by the library controller 116 via EIDE, SCSI, USB or similar standard interface cables 140.

The primary storage disc module 104 is installed directly beneath the stationary drive module 102 and includes a stationary frame 124, a carousel 156, a mechanism for carousel rotation which is internally mounted to the stationary frame 124 and a primary storage disc transfer mechanism 134. The carousel 156 is rotatably mounted to the stationary frame 124 which is mounted to the frame 112 of the disc drive module 102 and rotates on bearings about the central axis 122. The carousel rotating mechanism is a motor 166 fastened to the stationary frame 124 and geared to a planetary gear 130 on the base of the carousel 156. The motor 166 is connected to and controlled by the library controller 116 via EIDE, SCSI, USB or similar standard interface cables 140.

The carousel 156 has of two concentric, tubular walls 172, 176 between which discs 120 are stored. Discs 120 are stored vertically in radial positions about the central axis 122 and arranged in a toroidal configuration so that they can be lifted directly upward into the drives 114. The walls do not move independently and are connected to each other in a way that does not interfere with the lifting of the discs 120 into the drives 114. The inside of outer wall 172 and the outside of the inner wall 176 contain slots 148 to hold the edges of the discs 120 vertically in place. Discs 120 are prevented from falling down through the carousel 156 by stop rings 180 installed around the base of the slots 148. During storage, the discs 120 rest in slots 148 between the two walls 172, 176 of the carousel 156 on the stop rings 180 with between one-third and one-half of the disc 120 extending below the bottom of the inner wall 176 of the carousel 156. In the preferred configuration there may be 288 disc slots 148 in the carousel 156.

Two disc slots 148 on the carousel 156 are reserved for storage disc passthrough from the secondary storage disc module 106 to the drive module 102. The stop ring 180 have openings at the passthrough slot 136 so that a disc 120 from the secondary storage disc module 106 can be lifted from the secondary storage disc module 106 through the passthrough slot 136 of the primary carousel 156 and into the passthrough device 126 in the drive module 102.

Figure 3:
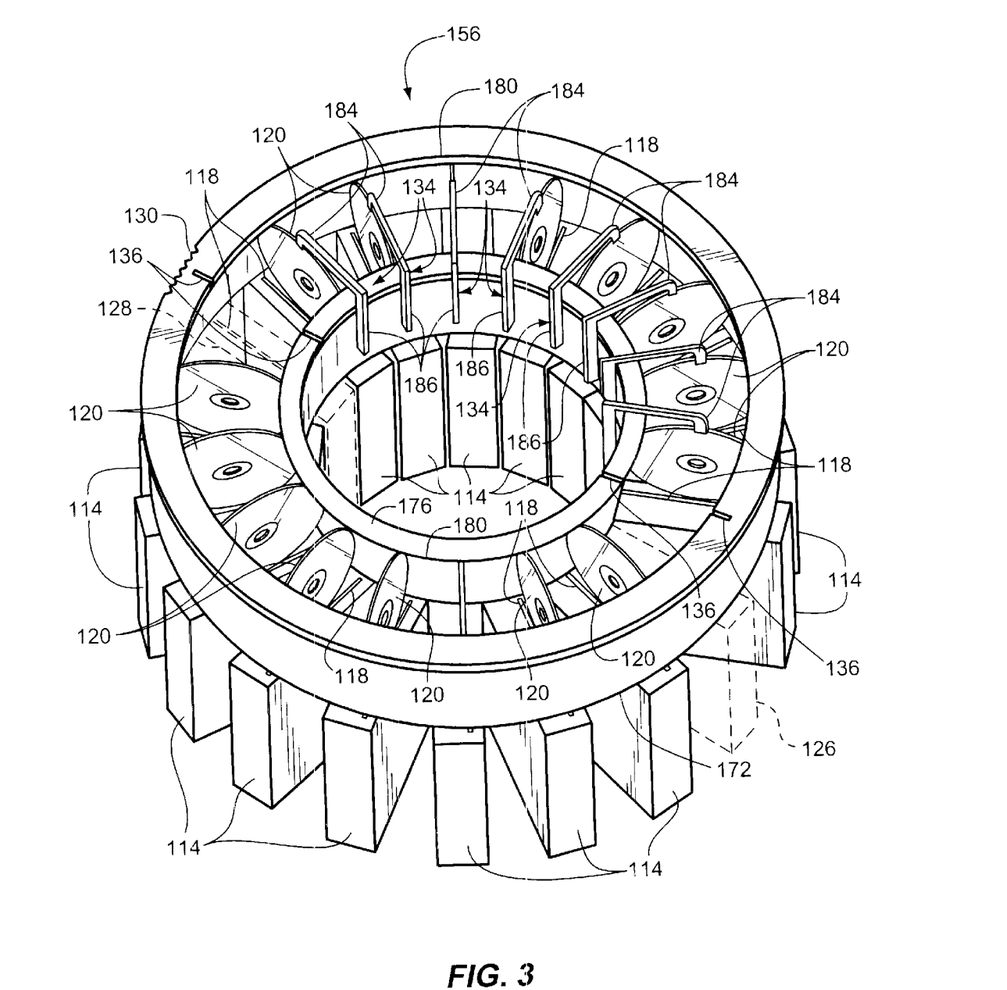
FIG. 3 is a lower perspective cut away view of the apparatus in accordance with the present invention showing the disc drives, the disc access port transfer device, the disc passthrough device, the primary storage disc carousel and some of the primary storage disc transfer mechanisms.

FIG. 3 is a lower perspective view which shows the elements of FIG. 2 as well as a some of primary storage disc transfer mechanisms 134. There is one primary storage disc transfer mechanism 134 for each drive 114 and one for the disc access port 128. Each of the transfer mechanisms 134 operably lift a disc 120 into and receive a disc 120 from its associated disc drive 114 or disc access port 128. Each transfer mechanism 134 includes of an "L"-shaped, lift finger positioned directly beneath an opening 118 to a drive 114 or the disc access port 128. While not in operation, the lift fingers 184 are parked below the stored discs 120. A stem 186 of each lift finger 184 is vertically oriented between the inner wall 176 and the central axis 122 and adjacent to the inner wall 176 allowing the primary carousel 156 to rotate freely and position any disc slot 148 beneath the disc entrance slot 118 to any drive 114, the passthrough device 126 or the disc access port 128. The primary transfer mechanism 134 locks the position of the primary carousel 156, preferably by the lift finger 184 but it could be achieved by a separate specific locking mechanism. A lift finger motor 190 for each lift finger 184 is positioned next to and is attached to each lift finger stem 186 and raises and lowers the lift finger 184 to insert a disc 120 into and receive a disc 120 from its associated drive 114 or access port 128. Each motor 190 is separately controlled and operates independently from the other motors 190. The lift motors 190 are connected to and controlled by the library controller 116 via EIDE, SCSI, USB or similar standard interface cables 140.

The secondary storage disc module 106 is installed directly beneath the primary storage disc module 104 and includes a stationary frame 222, a carousel 194, a mechanism for carousel rotation and a secondary storage disc passthrough transfer mechanism 146. The secondary storage disc module 106 is used as long term storage of discs 120 that are not frequently used. The carousel 194 is rotatably mounted to the stationary frame 222 which is mounted to the frame of the primary storage disc module 104 and rotates on bearings about the central axis 122. The carousel rotating mechanism is a motor 196 fixed to the stationary frame 222 and geared to a planetary gear 130 on the base of the carousel 194. The motor 196 is connected to and controlled by the library controller 116 via EIDE, SCSI, USB or similar standard interface cables 140.

The carousel 194 includes of two concentric, tubular walls 200 and 204 between which the discs 120 are stored. Discs 120 are stored vertically in radial positions about the central axis 122 and arranged in a toroidal configuration so that they can be lifted directly upward. The walls 200 and 204 do not move independently and are connected to each other in a way that does not interfere with the lifting of the discs 120 into the drives 114. The secondary carousel 194 has slots 148 to hold the edges of discs 120 between the inner and outer walls in the same manner as the primary carousel 156. Discs 120 are prevented from falling down through the carousel 194 by stop rings 206 installed around the base of the slots 148. During storage, the discs 120 rest in slots 148 between the outer wall 200 and inner wall 204 of the carousel 194 on the stop rings 206. In the preferred configuration there may be 288 disc slots 148 in the carousel 194.

The secondary storage disc passthrough transfer mechanism 146 transfers a disc 120 between the secondary disc storage carousel 194 and the secondary storage disc passthrough device 126, through the passthrough slot 136 in the primary disc storage carousel 156. The passthrough transfer mechanism 146 is also capable of transferring a disc 120 between the primary storage disc carousel 156 and the passthrough device 126. The passthrough transfer mechanism 146 is attached to the stationary frame 222 beneath the passthrough device 126. When not in operation, the mechanism 146 is parked between the inner wall 204 and the central axis 122 allowing the primary 156 and secondary 194 carousels to rotate freely. The passthrough transfer mechanism 146 locks the position of the primary carousel 156 and the secondary carousel 194 when transferring a disc. The passthrough mechanism motor 210 is connected to and controlled by the library controller 116 via EIDE, SCSI, USB or similar standard interface cables 140.

Discs 120 in the secondary storage disc module 106 must be transferred to an empty slot 148 the primary carousel 156 before they can be read. To achieve this, the following steps are followed:

1. The desired disc 120 in the secondary storage disc carousel 194 is aligned directly beneath the passthrough device 126 in the drive module 102;
2. The passthrough slot 136 in the primary storage disc carousel 156 is aligned directly beneath the passthrough device 126 in the drive module 102;
3. The secondary storage disc passthrough transfer mechanism 146 lifts the disc 120 from the secondary carousel 194, through a passthrough slot 136 in the primary carousel 156 and partially inserts it into the passthrough device 126;
4. The internal slot-in mechanism of the passthrough device 126 grabs the disc 120 and loads it into the device 126 for temporary storage;
5. The primary storage disc carousel 156 is rotated to align the selected empty disc slot 148 directly beneath the passthrough device 126;
6. The passthrough device 126 ejects the disc 120 which is received by the passthrough transfer mechanism 146.
7. The passthrough transfer mechanism 146 lowers the disc into the slot 148 on the primary storage disc carousel 156.

Once in the primary carousel 156, a disc 120 can be read in any drive 114 or removed via the disc access port 128. A disc 120 from the primary carousel 156 can be transferred to the secondary storage disc carousel 194 by reversing the steps outlined above.

All primary storage disc transfer mechanisms 134 and the secondary storage disc passthrough mechanism 146 are equipped with disc sensors, preferably optical reflective sensors, which verify the absence or presence of a disc 120 in carousel slots 148 before transfer is initiated to avoid erroneous loading and unloading of discs 120. Preferably the sensors are designed to detect the signature of a passthrough slot 136 in the primary carousel 156. Each carousel is provided with a carousel position sensor which monitors the carousels' step position. All sensors are operably connected to the library controller 116 which continuously monitors the state of the system 100 as a whole and the state of each component in the system 100.

The supply module 108 beneath the secondary storage disc module 106 encloses power supplies 218 for the disc drives 114 and library control electronics 116 and the environmental control equipment 220 including the blowers 240 for the system 100, and the air filters to avoid dust that could disturb operation of the optical storage system.

Figure 1:
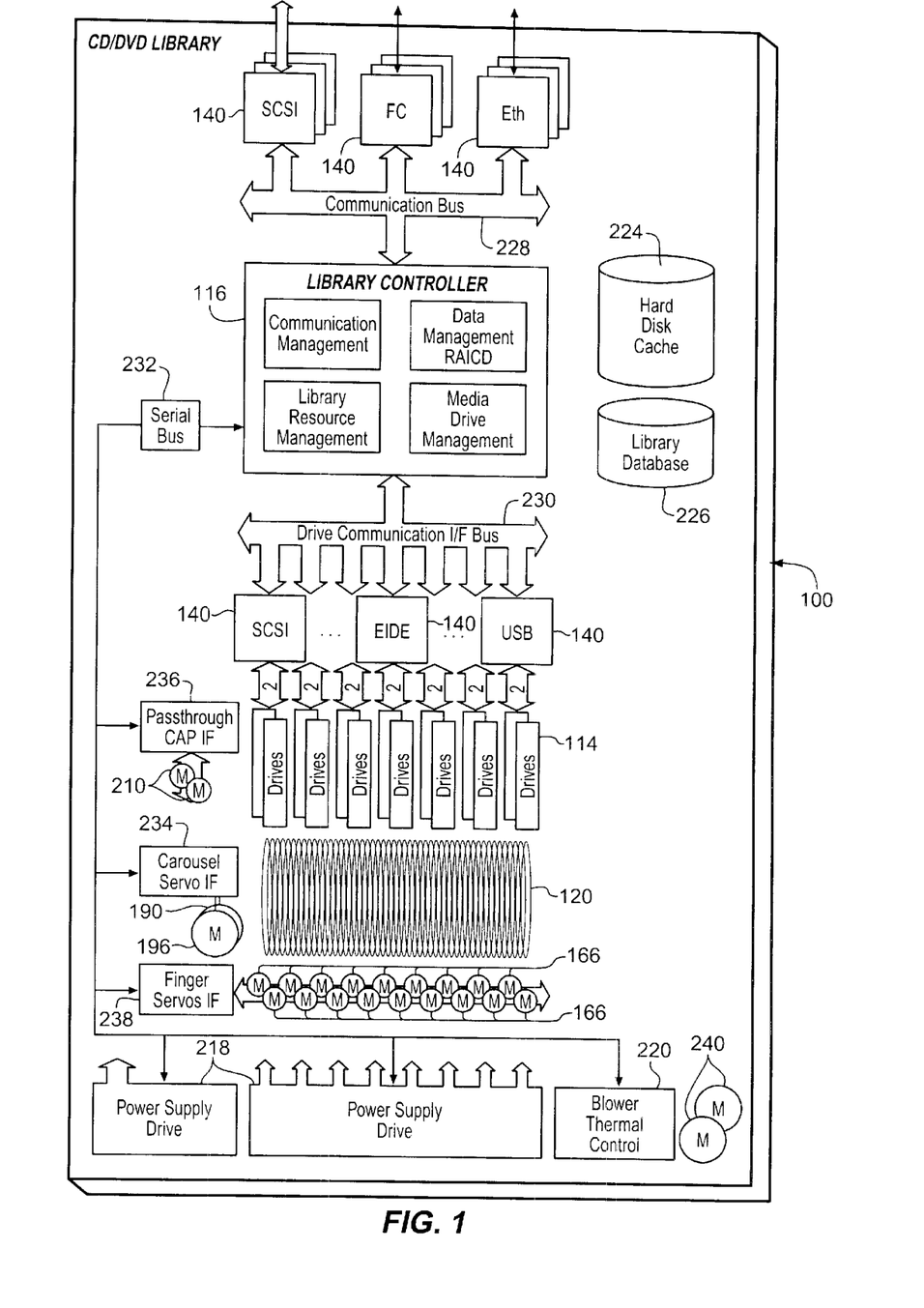
FIG. 1 is a functional block diagram of the control system for the apparatus in accordance with the present invention.

FIG. 1 is a block diagram of the control system for the system 100. The library controller 116 coordinates and monitors the operation of the drives 114, motors 166, 190, 196, 210, carousels 156, 194, and other devices in the system 100. It also manages the communication of data between the user and the library and the external interface. The controller 116 includes an internal hard disc cache 224 and a library database 226 to speed communications and system response time.

The controller 116 can be connected to external equipment via EIDE, SCSI, USB, Ethernet or other standard external connectors 140 which are connected to the controller's communication bus 228. The controller 116 is connected to the drives 114 by a dedicated drive interface bus 230 utilizing standard EIDE, SCSI, USB or other connections 140. The library controller 116 is connected to the other equipment in the system 100 by a separate serial interface bus 232. This serial bus 232 is connected to the primary carousel 156, the secondary carousel 194, and the carousel position sensors through a carousel servo interface 234. The serial bus 232 is connected to the passthrough device 126 and the passthrough transfer mechanism 146 through a passthrough interface 236. The serial bus 232 is connected to the primary disc transfer mechanisms 134 and the disc sensors through a finger servo interface 238. The serial bus 232 is directly connected to the power supplies 218, the environmental control equipment 220 and blowers 240, and the disc access port 128.

Figure 5:
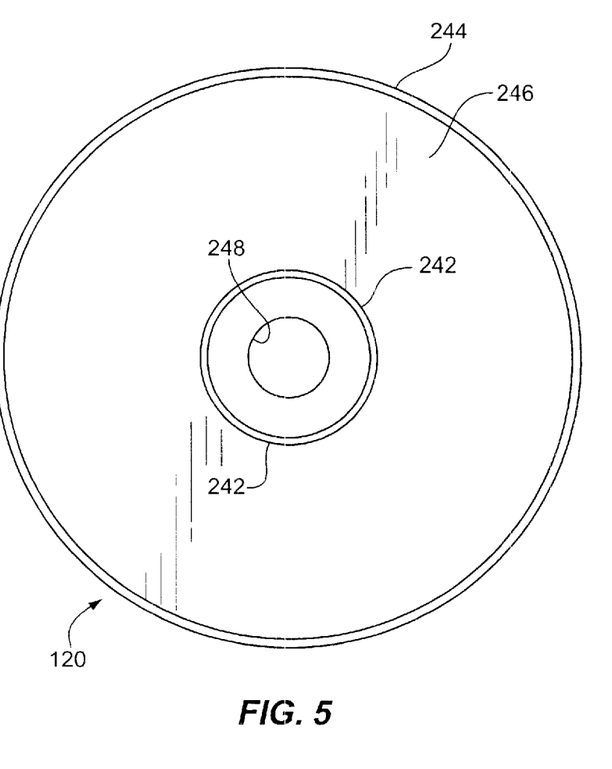
FIGS. 5 and 6 are plan and section views, respectively, of a storage disc with disc protection rings.
Figure 6:
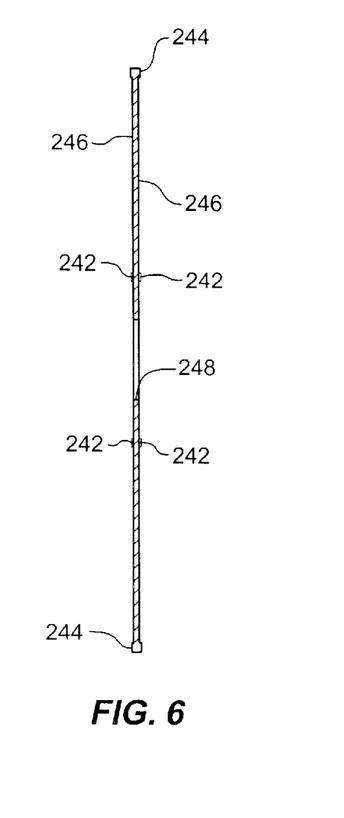

The data storage disc 120 used in the system 100 are flat, annular disc bodies with a central aperture 248, an outer rim portion 244, and a data storage portion 246 that has been impregnated with a storage material as shown in FIG. 5 and FIG. 6, although the system 100 can be configured to use any similar types of storage media such as CDs, DVDs, or CD-ROMs that fit into a standard 5.25 inch format disc drive 114. The central aperture 248 provides a space for the insertion of a spindle for rotation and alignment within the drives 114 or other devices in the drive module 102.

Both sides of the discs 120 have an inner protective band 242 and an outer protective rim 244. The band 242 and the rim 244 can be made of metal or some other material, including the same material as the disc 120. The inner band 242 is adhered to the surface of the disc between the data storage surface 246 and the central aperture 248. The outer rim 244 is adhered to and covers the outer rim portion of the disc 120. In the present embodiment, the protective rim 244, is one piece of material that wraps around the edge of the disc 120, thus completely covering the outer rim portions of both sides of the disc 120 and the outer edge of the disc 120.

The purpose of the protective band 242 and protective rim 244 is to prevent damage to the data storage surface 246 of the disc 120 through contact with other discs 120 when they are stacked together or otherwise in contact. Furthermore, the outer protective rim 244 protects the disc 120 from damage through contact with the primary carousel 156, the secondary carousel 194, the primary transfer mechanism 134, the secondary passthrough transfer mechanism 146, the drives 114, the passthrough device 126, or the access port 128.

The above specification, examples and data provide a description of the apparatus, system and method of the invention. Since many embodiments of the invention can be made without departing from the spirit and scope of the invention, the invention is defined by the following claims.

What is claimed is:

1. A data storage disc handling apparatus comprising:
   a disc drive module having a drive module frame having a series of disc drive units mounted on the drive module frame arranged around and spaced from a central axis;
   a primary storage disc module vertically mounted adjacent to the drive module, the primary storage disc module for carrying a plurality of data storage discs arranged side by side vertically in a toroidal configuration in a carousel;
   a transfer mechanism in the primary storage disc module having a movable lift mechanism for each disc drive unit vertically aligned with an entrance slot in its associated drive unit in the disc drive module frame adapted to transfer a storage disc from the primary storage disc module to its associated disc drive unit; and
   a control system connected to each of the disc drive units, the transfer mechanism, and the primary storage disc module for controlling transfer of data storage discs between the primary storage disc module and the disc drive units.

2. The apparatus according to claim 1 wherein the drive module frame is stationary and the carousel is rotatably mounted.

3. The data disc storage handling apparatus according to claim 2 wherein the carousel is rotatably mounted to a stationary frame within the primary storage disc module.

4. The data disc storage handling apparatus according to claim 2 wherein the carousel is rotated by a motor mounted to the stationary frame of the primary storage disc module.

5. The storage disc handling apparatus as described in claim 4 wherein the retainer is a stop ring attached to the base of the slotted side of each of the carousel walls that reduces the space between the walls within each slot to a distance less than that of the diameter of the storage discs thereby preventing the storage discs from completely falling through the slots in the carousel.

6. A storage disc handling apparatus as described in claim 5 wherein the disc access port includes a removable storage disc cartridge capable of holding a storage disc and a transfer device for transferring a storage disc between the cartridge and the primary storage disc module.

7. A storage disc handling apparatus as described in claim 2 further comprising a secondary storage disc module vertically mounted beneath the primary storage disc module carrying another plurality of data storage discs arranged side by side vertically in another toroidal configuration in a secondary storage disc carousel.

8. A storage disc handling apparatus as described in claim 7 wherein the secondary storage disc carousel is comprised of two concentric, tubular walls having vertical slots to hold a plurality of discs upright between the walls in a toroidal configuration about the central axis so that a portion of each of the discs extends below one or both walls of the carousel.

9. A data disc storage handling apparatus according to claim 7 wherein the secondary storage disc carousel is rotatably mounted to a stationary frame within the secondary storage disc module.

10. A data disc storage handling apparatus according to claim 7 wherein the secondary storage disc carousel is rotated by a motor mounted to the stationary frame of the secondary storage disc module.

11. A data disc storage handling apparatus according to claim 1 wherein the carousel has two concentric, tubular walls having vertical slots to hold a plurality of discs upright between the walls in the toroidal configuration about the central axis.

12. The data disc storage handling apparatus according to claim 11 wherein a portion of each of the discs extend below one of the walls of the carousel.

13. The storage disc handling apparatus as described in claim 3 wherein the storage discs in the carousel are retained from falling through the slots and out of the carousel by a disc retainer.

14. A storage disc handling apparatus as described in claim 1 further comprising a disc access port in the disc drive module which allows discs to be inserted and removed from the storage disc handling apparatus.

15. A data storage disc comprising:
a flat annular disc-shaped body having a data storage surface thereon, and outer rim portion, and a central hole therethrough; and
a raised rim around the outer rim portion to protect the data storage surface from contact and damage during handling or storage.

16. The data storage disc according claim 15 further comprising an inner raised band around the central hole adjacent the data storage surface for protection of the data storage surface from contact with other discs when concentrically stacked.

17. A data storage module handling apparatus comprising:
a plurality of removable data storage modules;
a toroidal configuration of storage locations for receiving and carrying the modules in a generally annular arrangement;
a plurality of module drives mounted vertically adjacent the storage locations in a generally annular arrangement;
a means for moving any module into and out of each selected module drive on demand; and
control means for directing operation of the means for moving the modules and controlling selection and operation of the module drives.

18. The apparatus according to claim 17 wherein the modules are data storage discs and the module drives are disc drives.

19. The apparatus according to claim 17 further comprising a storage transfer means for transferring data storage modules into and out of the toroidal configuration of storage locations.

20. A method of handling and storing a plurality of data storage modules comprising the steps of:
arranging a plurality of module storage locations in a toroidal configuration;
arranging a plurality of module drives vertically adjacent to the toroidal configuration of storage locations;
placing a plurality of modules in the storage locations;
rotating the storage locations relative to the module drives to align a selected drive with a selected storage location; and
transferring a selected module between the selected storage location and the selected drive module.

* * * * *